(12) United States Patent
Wong et al.

(10) Patent No.: US 9,520,730 B2
(45) Date of Patent: Dec. 13, 2016

(54) METHOD AND SYSTEM FOR CHARGING HIGH VOLTAGE BATTERY PACKS

(71) Applicant: FORD GLOBAL TECHNOLOGIES, LLC, Dearborn, MI (US)

(72) Inventors: Richard Kai Wong, Ann Arbor, MI (US); Thanh D. Pham, Canton, MI (US); Greg Edward Gauthier, Dearborn, MI (US); Gene Willi, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 14/109,278

(22) Filed: Dec. 17, 2013

(65) Prior Publication Data

US 2015/0171650 A1 Jun. 18, 2015

(51) Int. Cl.
*H02J 7/14* (2006.01)
*H02J 7/04* (2006.01)
*H02J 7/00* (2006.01)
*B60L 11/18* (2006.01)

(52) U.S. Cl.
CPC .......... *H02J 7/0047* (2013.01); *B60L 11/1868* (2013.01); *H02J 2007/0049* (2013.01)

(58) Field of Classification Search
CPC ................ H02J 7/0047; H02J 2007/0049
USPC ................................................ 320/104, 148
See application file for complete search history.

(56) References Cited

U.S. PATENT DOCUMENTS

| 5,516,149 | A | * | 5/1996 | Moore | A63C 17/26 280/811 |
|---|---|---|---|---|---|
| 5,602,526 | A | * | 2/1997 | Read | B60Q 3/06 116/28 R |
| 5,923,841 | A | * | 7/1999 | Lee | G06F 21/31 726/19 |
| 7,714,541 | B2 | | 5/2010 | Stamos | |
| 8,129,950 | B2 | | 3/2012 | Colin | |
| 8,390,247 | B1 | * | 3/2013 | Harris | B60L 11/1818 320/104 |
| 8,525,470 | B2 | * | 9/2013 | Gale | H02J 7/0072 307/149 |
| 8,872,474 | B2 | * | 10/2014 | Scheucher | B60K 1/04 320/107 |
| 9,365,115 | B2 | * | 6/2016 | Ferrel | H02J 7/1423 |
| 2004/0004458 | A1 | * | 1/2004 | Tanaka | H02J 7/022 320/106 |
| 2007/0188140 | A1 | * | 8/2007 | Chen | H02J 7/0013 320/128 |

(Continued)

FOREIGN PATENT DOCUMENTS

CN 102946123 A 2/2013

OTHER PUBLICATIONS

Hybrid Vehicle PEC Charger System.

*Primary Examiner* — M'Baye Diao
(74) *Attorney, Agent, or Firm* — David Kelley, Esq.; Tung & Associates (57) ABSTRACT

A method and system for charging high voltage battery packs includes connecting a charger to a power source, connecting the charger to a battery pack, connecting a computer to a battery energy control module of the battery pack and charging the battery pack from the power source through the charger by running a software program on the computer and a system for conducting the method.

20 Claims, 7 Drawing Sheets

(56) References Cited

U.S. PATENT DOCUMENTS

| | | | |
|---|---|---|---|
| 2010/0270980 A1* | 10/2010 | Newhouse | B60L 11/1868 |
| | | | 320/152 |
| 2011/0204844 A1 | 8/2011 | Adames | |
| 2011/0245987 A1* | 10/2011 | Pratt | H01M 10/44 |
| | | | 700/295 |
| 2012/0201041 A1* | 8/2012 | Gergets | B60Q 1/2611 |
| | | | 362/493 |
| 2012/0262110 A1 | 10/2012 | Soong | |
| 2013/0099747 A1* | 4/2013 | Baba | H02J 7/0019 |
| | | | 320/118 |
| 2013/0201316 A1* | 8/2013 | Binder | H04L 67/12 |
| | | | 348/77 |
| 2013/0307480 A1* | 11/2013 | Boggs | B60L 3/00 |
| | | | 320/118 |
| 2015/0129332 A1* | 5/2015 | Seto | H01M 10/6557 |
| | | | 180/65.1 |
| 2015/0144409 A1* | 5/2015 | Fujii | B60L 11/1879 |
| | | | 180/65.1 |

* cited by examiner

METHOD AND SYSTEM FOR CHARGING HIGH VOLTAGE BATTERY PACKS

FIELD

Illustrative embodiments of the disclosure generally relate to battery packs for electric vehicles (EVs). More particularly, illustrative embodiments relate to a method for charging high voltage HEV battery packs using a 120 volt A/C source.

BACKGROUND

High voltage batteries used in electric vehicles such as FHEVs (full hybrid electric vehicles), PHEVs (plug-in hybrid electric vehicles) and BEVs (battery electric vehicles) may periodically become depleted and require recharging. In some instances, the usual recharging method such as using the vehicle engine or a wall charger may not be available. Therefore, a method for charging high voltage battery packs outside the normal recharging methodology is needed.

SUMMARY

Illustrative embodiments of the disclosure are generally directed to a method for charging high voltage battery packs. An illustrative embodiment of the method includes connecting a charger to a power source, connecting the charger to a battery pack, connecting a computer to a battery energy control module of the battery pack and charging the battery pack from the power source through the charger by running a software program on the computer.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Referring initially to FIGS. 1 and 6-9, an exemplary battery charging system 100 which is suitable for implementation of an illustrative embodiment of the method for charging high voltage battery packs is shown. The method may utilize the system 100 to recharge a high voltage HV battery pack 101 such as under circumstances in which the usual recharging method such as using a vehicle engine or a wall charger may not be available. The HV battery pack 101 may be used as a source of electric power in a FHEV (full hybrid electric vehicle), PHEV (plug-in hybrid electric vehicle) or a BEV (battery electric vehicle), for example and without limitation. The HV battery pack 101 may have a BECM (battery energy control module) 102. A positive low voltage terminal 103 and a negative low voltage terminal 104 may be disposed in electrical contact with positive high voltage terminal 126 and negative high voltage terminal 127, respectively, of the HV battery pack 101 such as in the conventional manner.

Figure 1:
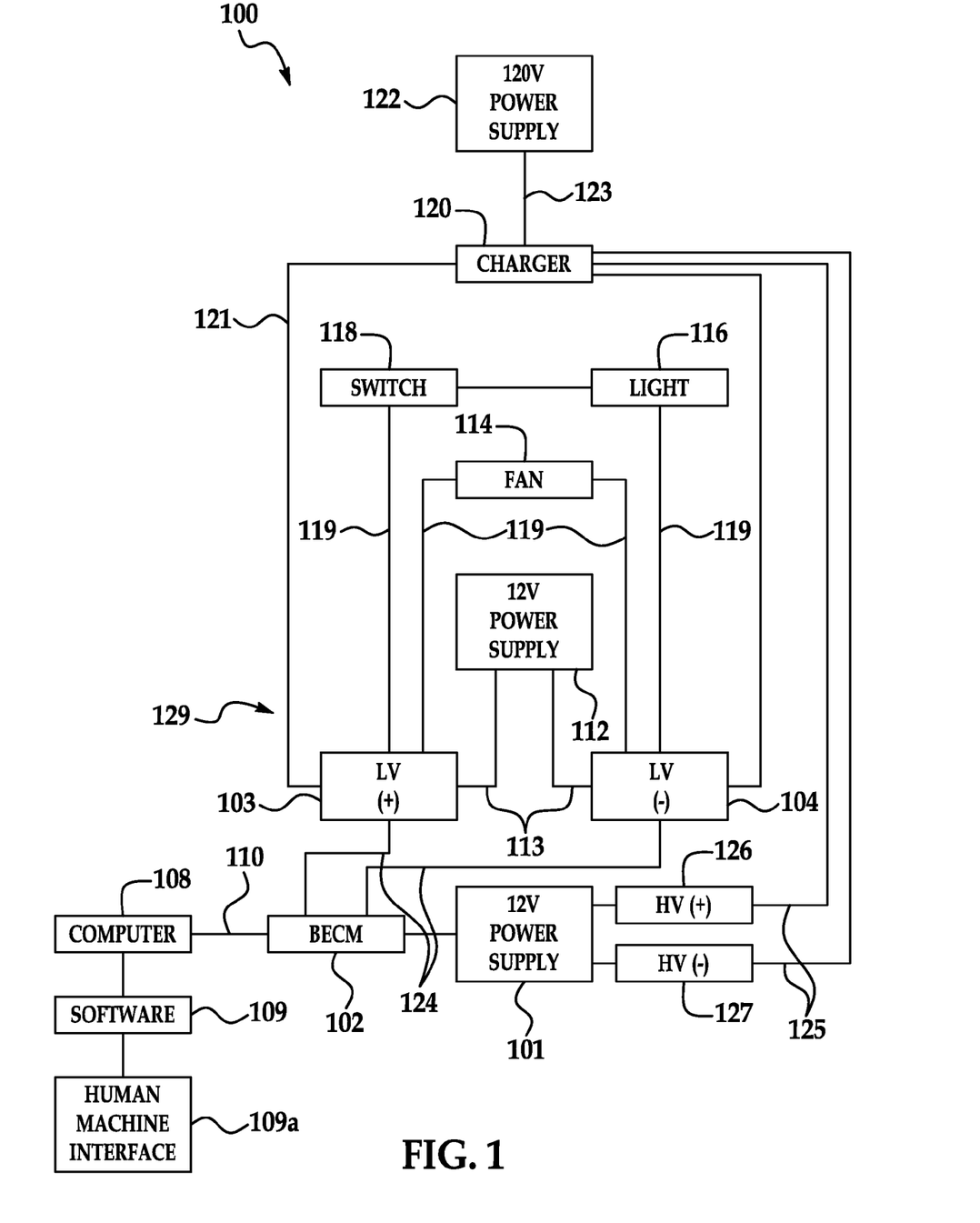
FIG. 1 is a general block diagram of an exemplary battery charging system which is suitable for implementation of an illustrative embodiment of the method for charging high voltage battery packs.

In implementation of the method, a computer 108 may be connected to the BECM 102 of the HV battery pack 101 such as via a computer connecting interface 110. The computer 108 is loaded with software 109 which implements the functions of the method as will be hereinafter described. The software 109 may produce a human machine interface 109a on the computer 108. The human machine interface 109a may set parameters for charging the HV battery pack 101. A 12-volt power supply 112 may be connected to the positive low voltage terminal 103 and the negative low voltage terminal 104 such as via power supply connecting interfaces 113, and connect to the BECM 102 via interface 124. A fan 114, a light 116 and a switch 118 which operates the light 116 and/or the fan 114 may be connected to the positive low voltage terminal 103 and the negative low voltage terminal 104 such as via accessory connecting interfaces 119. A charger 120 may be electrically connected to the positive low voltage terminal 103 and the negative low voltage terminal 104 such as via charger interfaces 121. The charger 120 may be an off-vehicle charger and may interface with the positive low voltage terminal 103 and the negative low voltage terminal 104 through the charger interfaces 121 or through a vehicle charging port 129. The charger 120 may be a PHEV charger which interfaces with a 120-volt power supply 122 such as via a power supply interface 123. The computer connecting interface 110, the power supply connecting interfaces 113, the accessory connecting interfaces 119, the charger interfaces 121 and the power supply interface 123 may be standard interface cables, controller area network (CAN) bus interfaces, cancase pinout connectors or other communication interfaces known by those skilled in the art.

In implementation of the method, the charger 120 is adapted to convert a 120-volt AC current into DC current which is transmitted to the HV battery pack 101 via the positive high voltage terminal 126 and the negative high voltage terminal 127 to recharge the HV battery pack 101. The software 109 loaded on the computer 108 may control initiation and implementation of the charging process as well as control of battery pack contactors which allow flow of electrical current into the HV battery pack 101. The software 109 may additionally indicate various parameters of the charging process such as the pack voltage, pack current, state of charge (%), battery pack contactor status and elapsed charging time, for example and without limitation. The software 109 may be programmed to automatically terminate the charging process after a preselected criteria is met (such as a predetermined state of charge of the battery pack 101 is attained, for example and without limitation) in order to prevent overcharging of the HV battery pack 101.

In exemplary implementation of the method, the BECM 102 of the HV battery pack 101 may be disconnected from a vehicle wire harness (not shown) of the vehicle. High voltage cable connectors high voltage terminal 126 and high voltage terminal 127 and a high voltage ISC connector (not shown) may additionally be disconnected from the HV battery pack 101. The charger 120 may be connected to the 120-volt power supply 122 and the positive low voltage terminal 103 and the negative low voltage terminal 104 of the HV battery pack 101. The 12-volt power supply 112, the fan 114, the light 116 and the switch 118 may additionally be connected to the positive low voltage terminal 103 and the negative low voltage terminal 104.

The computer 108 may be connected to the BECM 102. The software 109 on the computer 108 is run to facilitate charging of the HV battery pack 101 from the 120-volt power supply 122 through the charger 120.

An exemplary screen shot 124 which may appear on the computer 108 as the software is run is shown in FIGS. 6-9. The screen shot 124 may include a start charge button 125, a stop charge button 126, a pack voltage indicator 130, a pack current indicator 131, an SOC (state of charge) indicator 132 and a contactors indicator 133. The screen shot 124 may additionally include an elapsed time window 136 which indicates the charging time which has elapsed since initiation.

Figure 6:
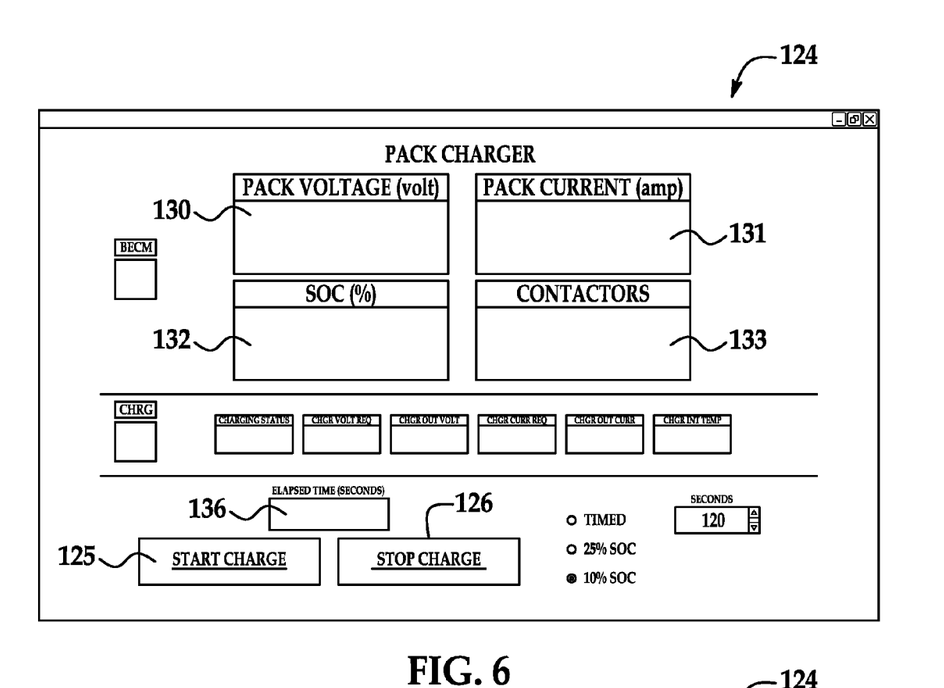
FIG. 6 is an exemplary initial computer screen shot in implementation of the method.
Figure 7:
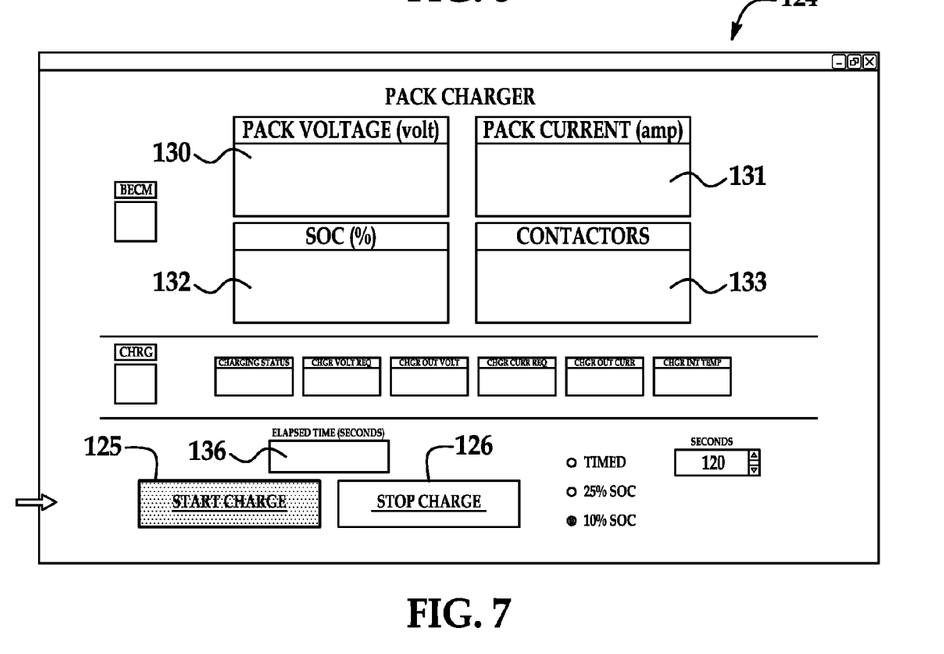
FIG. 7 is an exemplary computer screen shot in implementation of the method, more particularly illustrating initiation of battery charging.

As shown in FIG. 6, upon opening of the software, the pack voltage indicator 130, the pack current indicator 131, the SOC indicator 132, the contactors indicator 133 and the elapsed time window 136 may initially be blank. As shown in FIG. 7, an operator may initiate the charging process by clicking the start charge button 125.

In some embodiments, the software 109 may be programmed to query the HV battery pack 101 for diagnostic codes prior to charging to ensure that the HV battery pack 101 is in a satisfactory condition for charging. For example and without limitation, the software 109 may be programmed to prohibit the charging process if the BECM 102 has previously stored a diagnostic code that indicates a concern exists with the HV battery pack 101 such that a transfer of charge to the HV battery pack 101 should not be attempted. In some embodiments, the software 109 may be programmed with step-by-step instructions on setting up the system 100 and connecting the system 100 to the BECM 102 and the HV battery pack 101.

Figure 8:
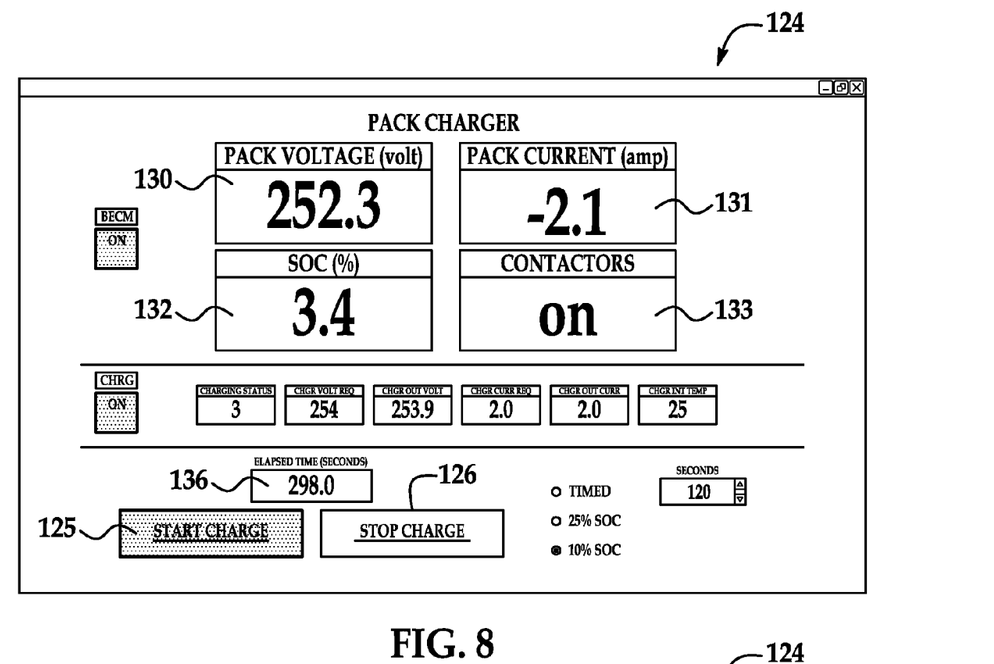
FIG. 8 is an exemplary computer screen shot in implementation of the method, more particularly illustrating progression of battery charging.

As shown in FIG. 8, the elapsed charging time, or time which has elapsed since charging was initiated, may be indicated in the elapsed time window 136. The pack voltage, the pack current and the SOC may be indicated in the pack voltage indicator 130, the pack current indicator 131 and the SOC indicator 132, respectively. The contactors indicator 133 may indicate whether the battery pack contactors are on or off.

Figure 9:
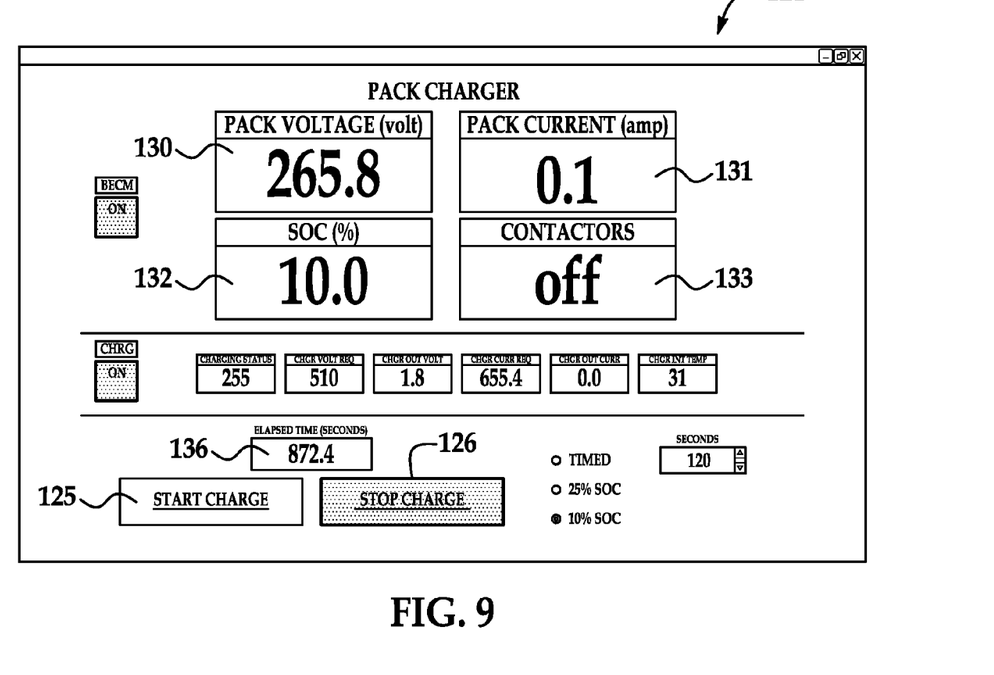
FIG. 9 is an exemplary computer screen shot in implementation of the method, more particularly illustrating termination of battery charging.

As shown in FIG. 9, upon conclusion, an operator (not shown) may terminate the charging process by clicking the stop charge button 126. In some embodiments, the software 109 may automatically terminate the charging process after a preselected criteria (such as a predetermined state of charge, for example and without limitation) is met in order to prevent overcharging of the HV battery pack 101. The charger 120 may then be disconnected from the HV battery pack 101 positive high voltage terminal 126 and high voltage terminal 127, the computer 108 disconnected from the BECM 102, the vehicle wire harness (not shown) re-connected to the BECM 102 and the high voltage cable connectors and high voltage ISC connector (not shown) reconnected to the battery pack 101.

Figure 2:
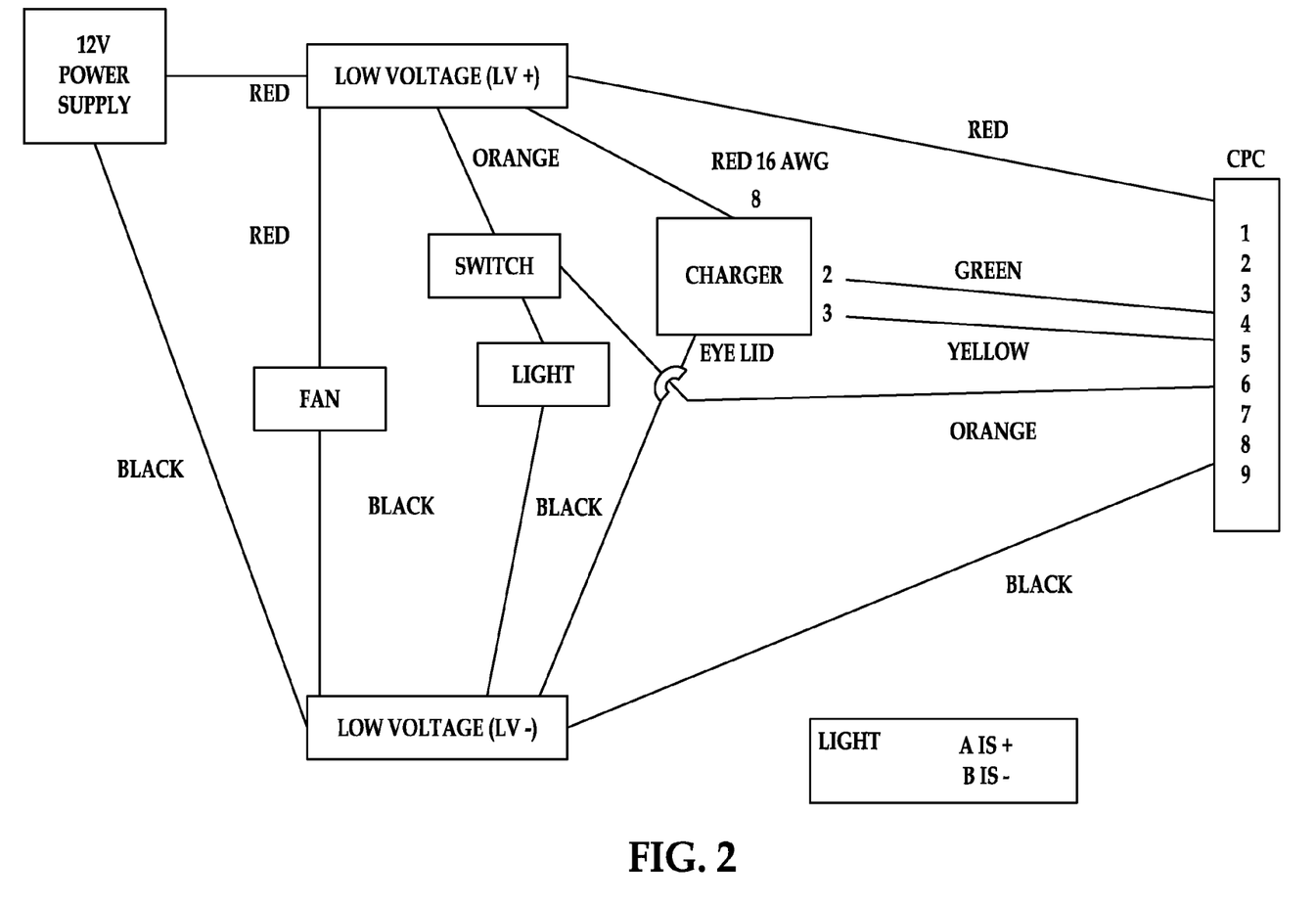
FIG. 2 is an exemplary specific implementation of a battery charging system suitable for implementation of the method.
Figure 3:
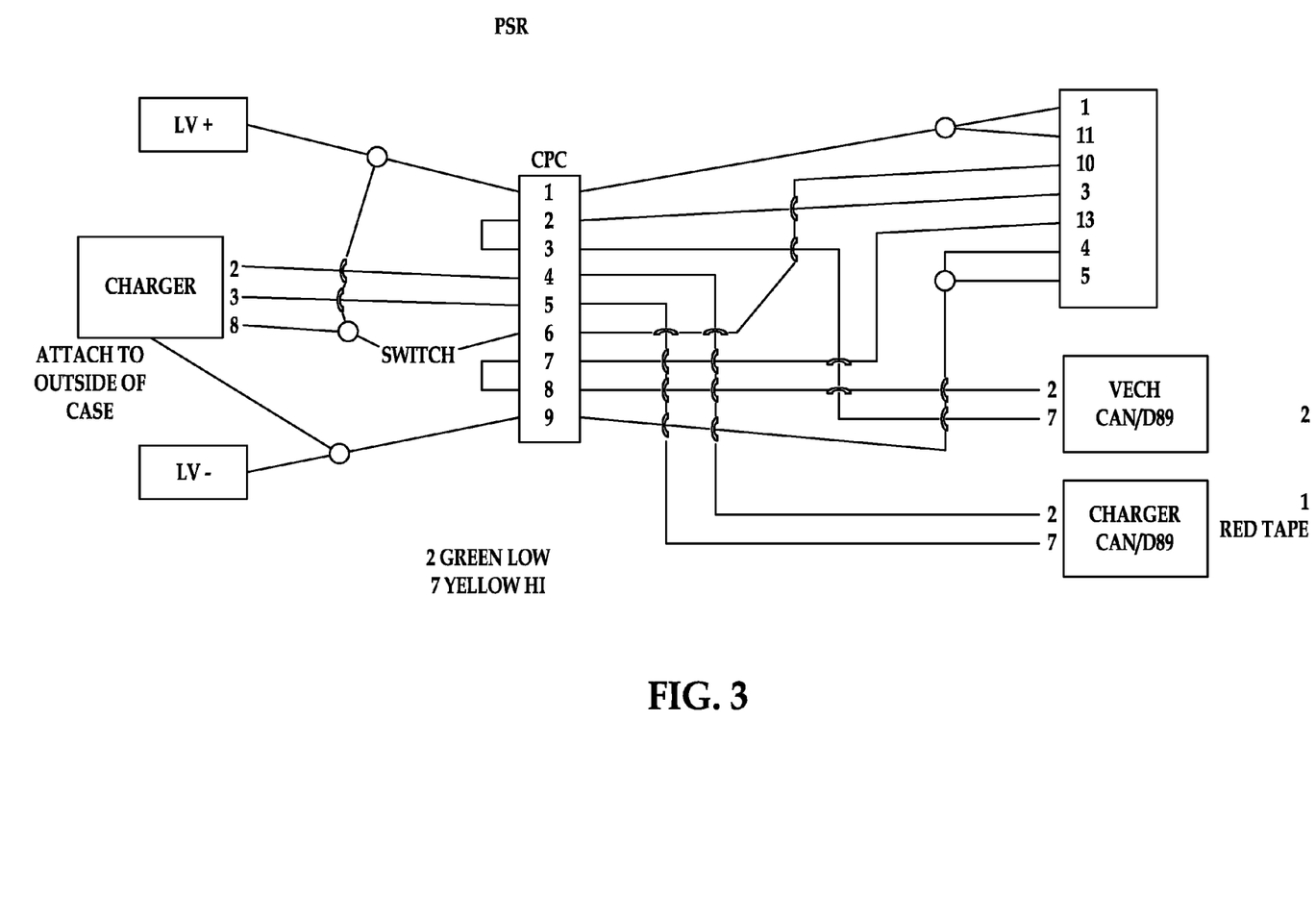
FIG. 3 is an alternative exemplary specific implementation of a battery charging system suitable for implementation of the method.
Figure 4:
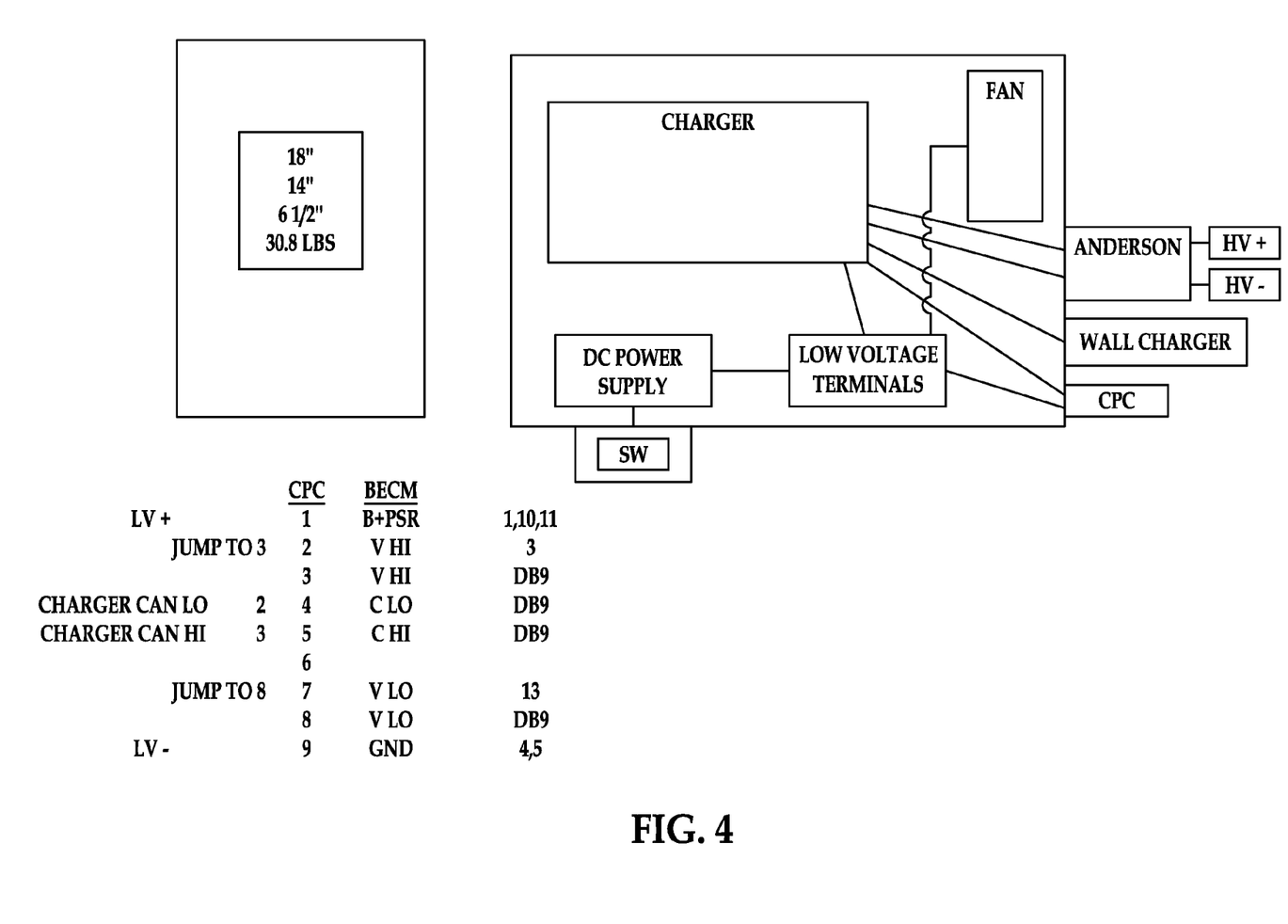
FIG. 4 is another alternative exemplary specific implementation of a battery charging system suitable for implementation of the method.

Exemplary specific implementations of a battery charging system which is suitable for implementation of the method are shown in FIGS. 2-4.

Figure 5:
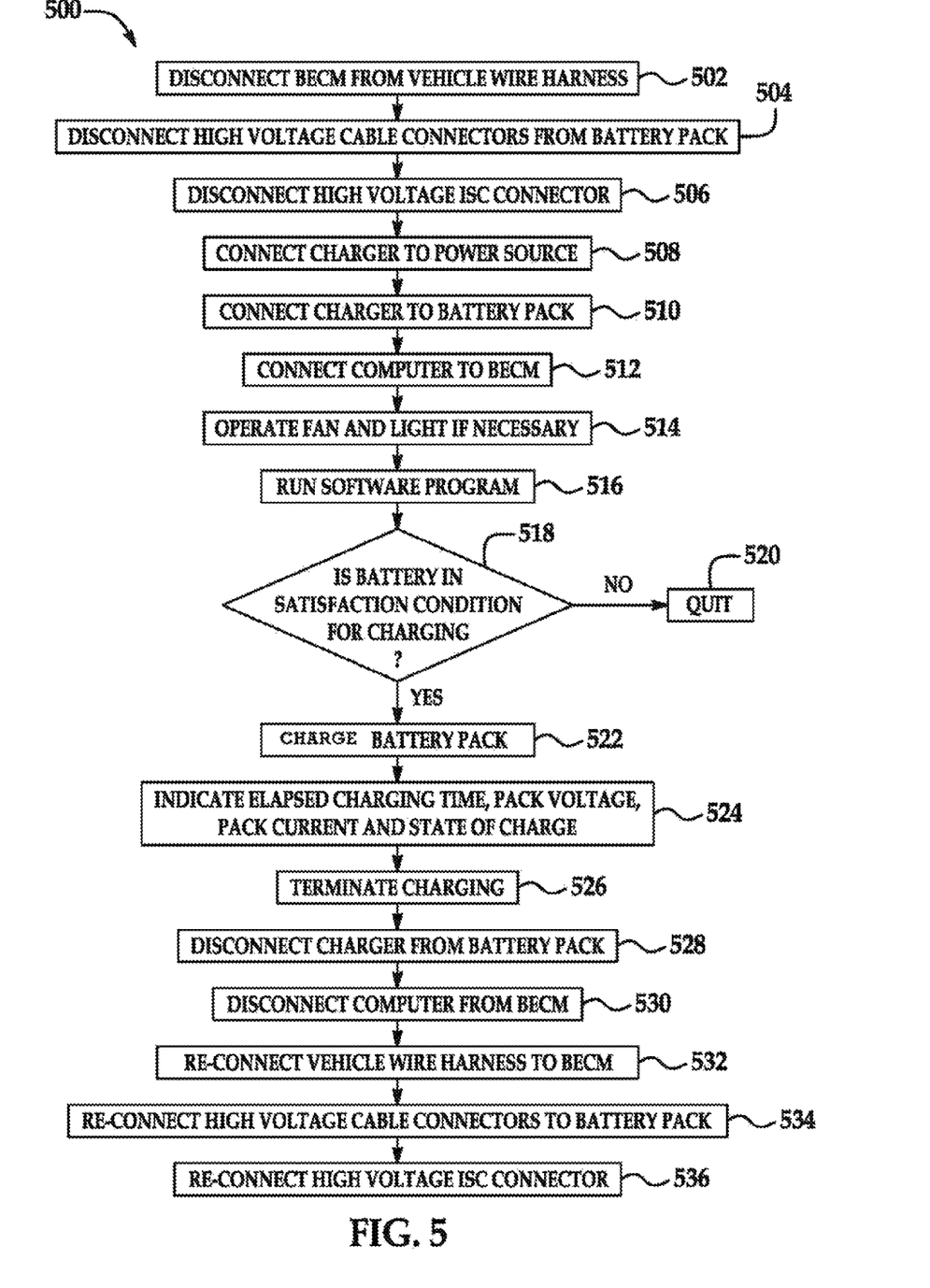
FIG. 5 is a flow diagram of an illustrative embodiment of the method for charging high voltage battery packs.

Referring next to FIG. 5, a flow diagram 500 of an illustrative embodiment of the method for charging high voltage battery packs is shown. In block 502, a BECM of an HV battery pack is disconnected from a vehicle wire harness in a vehicle. In block 504, high voltage cable connectors are disconnected from the battery pack. In block 506, a high voltage ISC connector may be disconnected from the battery pack. In block 508, a charger is connected to a 120-volt power source. In block 510, the charger is connected to the battery pack. In block 512, a computer loaded with battery pack charging software is connected to the BECM. In block 514, a fan may be operated as necessary for cooling purposes.

In block 516, the software program is run. In block 518, a determination may be made as to whether the battery pack is in satisfactory condition for charging. If the battery pack is not in satisfactory condition for charging, then the method may end in block 520. For example and without limitation, charging of the battery pack may be prohibited if the BECM has previously stored a diagnostic code that indicates a concern exists with the battery pack such that a transfer of charge to the battery pack should not be attempted. If the battery pack is in satisfactory condition for charging, then the battery pack is charged in block 522. During charging of the battery pack, the elapsed charging time, the pack voltage, the pack current and the state of charge (SOC) of the battery may be indicated in block 524.

In block 526, charging may be terminated upon successful charging of the battery pack. In block 528, the charger is disconnected from the battery pack. In block 530, the computer is disconnected from the BECM. In block 532, the vehicle wire harness is reconnected to the BECM. In block 534, the high voltage cable connectors are re-connected to the battery pack. In block 536, the high voltage ISC connector is re-connected to the battery pack.

Although the embodiments of this disclosure have been described with respect to certain exemplary embodiments, it is to be understood that the specific embodiments are for purposes of illustration and not limitation, as other variations will occur to those of skill in the art.

What is claimed is:
1. A method for charging a battery pack in a vehicle, comprising:
 connecting an off-vehicle charger to a power source;
 connecting the charger to the battery pack;

connecting a computer to a battery energy control module (BECM) of the battery pack following disconnecting the BECM from a wire harness of the vehicle; and charging the battery pack from the power source through the charger by running a software program on the computer, the software program embodied on a non-transitory computer-readable medium, the software program configured to cause at least one processor to initiate and control the charging of the battery pack based on an indicated condition of the battery pack received by the computer through the BECM.

2. The method of claim 1 wherein charging the battery pack by running a software program on the computer comprises indicating a state of charge of the battery pack on the computer.

3. The method of claim 1 wherein charging the battery pack by running a software program on the computer comprises indicating a voltage of the battery pack on the computer.

4. The method of claim 1 wherein charging the battery pack by running a software program on the computer comprises indicating a current of the battery pack on the computer.

5. The method of claim 1 wherein charging the battery pack by running a software program on the computer comprises indicating a contactor status of the battery pack on the computer.

6. The method of claim 1 wherein charging the battery pack by running a software program on the computer comprises indicating an elapsed charging time on the computer.

7. The method of claim 1 wherein charging the battery pack by running a software program on the computer comprises termination of charging the battery pack by an operator.

8. The method of claim 1 wherein charging the battery pack by running a software program on the computer comprises automatic termination of charging the battery pack after a preselected criteria is met.

9. A method for charging a battery pack in a vehicle, comprising:
connecting an off-vehicle charger to a power source;
connecting the charger to the battery pack;
connecting a computer to a battery energy control module (BECM) of the battery pack following disconnecting the BECM from a wire harness of the vehicle;
determining whether the battery pack is in satisfactory condition for charging by running a software program on the computer, the software program embodied on a non-transitory computer-readable medium, the software program configured to cause at least one processor to initiate and control the charging of the battery pack based on an indicated condition of the battery pack received by the computer through the BECM; and
charging the battery pack from the power source through the charger if the battery pack is in satisfactory condition for charging by running the software program on the computer.

10. The method of claim 9 wherein charging the battery pack by running a software program on the computer comprises indicating a state of charge of the battery pack on the computer.

11. The method of claim 9 wherein charging the battery pack by running a software program on the computer comprises indicating a voltage of the battery pack on the computer.

12. The method of claim 9 wherein charging the battery pack by running a software program on the computer comprises indicating a current of the battery pack on the computer.

13. The method of claim 9 wherein charging the battery pack by running a software program on the computer comprises indicating a contactor status of the battery pack on the computer.

14. The method of claim 9 wherein charging the battery pack by running a software program on the computer comprises indicating an elapsed charging time on the computer.

15. The method of claim 9 wherein charging the battery pack by running a software program on the computer comprises termination of charging the battery pack by an operator.

16. The method of claim 9 wherein charging the battery pack by running a software program on the computer comprises automatic termination of charging the battery pack after a preselected criteria is met.

17. A method for charging a battery pack in a vehicle, comprising:
connecting an off-vehicle charger to a power source;
connecting the charger to the battery pack;
connecting a computer to a battery energy control module (BECM) of the battery pack following disconnecting the BECM from a wire harness of the vehicle;
determining whether the battery pack is in satisfactory condition for charging by running a software program on the computer, the software program embodied on a non-transitory computer-readable medium, the software program configured to cause at least one processor to initiate and control the charging of the battery pack based on an indicated condition of the battery pack received by the computer through the BECM;
charging the battery pack from the power source through the charger if the battery pack is in satisfactory condition for charging by running the software program on the computer; and
during the charging indicating a state of charge of the battery pack, a voltage of the battery pack, a current of the battery pack, a battery pack contactor status of the battery pack and an elapsed charging time of the battery pack on the computer by running the software program on the computer.

18. The method of claim 17 wherein charging the battery pack by running a software program on the computer comprises termination of charging the battery pack by an operator.

19. The method of claim 17 wherein charging the battery pack by running a software program on the computer comprises automatic termination of charging the battery pack after a preselected criteria is met.

20. The method of claim 19 wherein charging the battery pack by running a software program on the computer comprises automatic termination of charging the battery pack after a preselected criteria is met, the preselected criteria comprising a predetermined state of charge of the battery pack.

* * * * *